United States Patent Office 3,046,249
Patented July 24, 1962

3,046,249
POLYMERS OF FORMALDEHYDE STABILIZED WITH HYDROXYANTHRAQUINONES AND PROCESS FOR MAKING THEM
Hans Dieter Hermann and Edgar Fischer, Frankfurt am Main, Germany, assignors to Farbwerke Hoechst Aktiengesellschaft vormals Meister Lucius & Brüning, Frankfurt am Main, Germany, a corporation of Germany
No Drawing. Filed Nov. 17, 1959, Ser. No. 853,455
Claims priority, application Germany Nov. 28, 1958
9 Claims. (Cl. 260—45.95)

The present invention relates to stabilized polymers of formaldehyde and a process for their manufacture.

It is known to convert pure, essentially anhydrous formaldehyde in the absence or presence of an inert solvent and in the presence of a catalyst initiating polymerization, preferably in the presence of a catalyst acting as an anion, into polymeric formaldehyde.

When the polymers of formaldehyde have thus been prepared, for example polyacetals and eupolyoxymethylenes, are worked up at temperatures which are necessarily within the range of 190° to 200° C. they tend to an extent which is partly considerable to depolymerize with re-formation of monomeric formaldehyde.

It is also known that the depolymerization of the polymeric formaldehyde at an elevated temperature can be restrained to a large extent by the addition of an appropriate stabilizer.

Polymers of formaldehyde having an improved stability can be obtained, for example, by reacting the polymers with a carboxylic acid anhydride, preferably acetic acid anhydride, in the presence of acid-binding substances. The aforesaid process is, however, complicated and uneconomic, it requires a large amount of carboxylic acid anhydrides and necessitates a particularly careful washing out of the stabilized polymer.

It is also known to obtain polymers of formaldehyde having an improved stability by adding an organic compound of one of the following classes:

(a) Hydrazine, substituted hydrazines and hydrazides,
(b) Secondary or tertiary monomeric aromatic amines,
(c) Phenols or substituted phenols,
(d) Urea, thiourea and the substitution products thereof.

In this case the stabilizer may either be present during the polymerization of the formaldehyde already or it may be subsequently incorporated with the polyformaldehyde before the latter is worked up.

The efficiency of the known stabilizers is, however, not yet sufficient for practical purposes and besides after having been worked up the polyformaldehydes to which the known stabilizers have been added often yield products having an undesired dull yellow to dull brown color. The tint of the products so obtained is further modified when they are used in practice, especially when they are exposed to light.

Colored polyformaldehydes whose tint remains fairly stable even after a working up in known manner have hitherto been prepared by adding dyestuff pigments to the polyformaldehydes.

Now we have found that hydroxyanthraquinone containing 2 to 8, and preferably 2 to 6 hydroxyl groups is very suitable for the coloration of polyformaldehyde and the derivatives thereof, for example acylated, especially acylated polymers of formaldehyde, and at the same time particularly suitable for stabilizing polyformaldehyde which loses less than 80% of its weight within 30 minutes at 200° C. under nitrogen. The hydroxyanthraquinones of the aforesaid kind excel the known stabilizers in their stabilizing effect, they are easily accessible and enable stable polymers to be obtained which after having been worked up are colored brilliant, pure tints. The colorations obtained do not undergo any change when exposed to light or the conditions under which polymers of formaldehyde are employed in practice.

The process of the invention thus constitutes a new method of treating polyformaldehyde and enables polymers to be obtained which are at the same time stable and provided with a fast coloration. As substances producing an appropriate stabilization and coloration there may be mentioned all anthraquinones containing 2 or more, preferably 2 to 6 hydroxyl groups, for example, 1,2-dihydroxyanthraquinone, 1,2,5,8-tetrahydroxyanthraquinone, 1,2,3,5,6,7-hexahydroxyanthraquinone, 1,2,4,5,6,8-hexahydroxyanthraquinone and 2,3-dihydroxyanthraquinone.

The above-mentioned polyhydroxyanthraquinones may be used alone or in combination with other known dyestuffs and/or stabilizers such as phenols, aromatic amines, urea derivatives or hydrazine derivatives in the presence or absence of an organic solvent, for example carbon tetrachloride, methylene chloride, pentane, heptane, tetrahydrofurane, diethyl ether, acetone, methyl ethyl ketone, methanol or ethanol. The solvent may contain water. In some cases it may be advantageous to add the stabilizing dyestuff during the polymerization process already.

The quantity of the hydroxyanthraquinone added depends on its efficiency, on the quality of the polymer to be stabilized and on the depth of color desired in the treated polymer. The quantity may vary between about 0.01 and about 10%, preferably 0.1 and 5% by weight, calculated on the polymer.

The process of the invention may be applied for stabilizing and coloring any polyformaldehyde, irrespective of the method by which it has been prepared.

The polymers of formaldehyde that have been stabilized by the process of the invention can be used for all purposes for which the polymers of formaldehyde are usually applied. They are, for example, suitable for use in the known methods of preparing films, fibers, shaped articles and the like.

The following examples serve to illustrate the invention but they are not intended to limit it thereto.

Example 1

10 grams of polyformaldehyde which loses 44% of its weight within 30 minutes at 200° C. under nitrogen were intimately mixed for 5 minutes by means of a high speed stirring device with 0.2 gram of 1,2,5,8-tetrahydroxyanthraquinone. The polyformaldehyde that had thus been stabilized decomposed only to the extent of 17% within 30 minutes at 200° C. under nitrogen and at a temperature within the range of 180° C. to 190° C. and under a pressure of 100 atmospheres (gage) it could be compressed to form deep red films which did not become brittle when stored.

Example 2

3 grams of polyformaldehyde which loses 45% of its weight within 30 minutes at 200° C. under nitrogen were suspended in 25 cc. of methanol while being stirred. The experiment was carried out several times and in each case 80 milligrams of one of the substances indicated in the following table were added. After the mixture had been allowed to stand for 20 hours at room temperature the methanol was distilled off, the residue was dried under reduced pressure and its stability was verified. The results can be gathered from the following table:

| Substance | Loss of weight after stabilization within 30 minutes at 200° C. under N₂, percent | Tint of the compressed polymers |
|---|---|---|
| β-dianaphtol | 51 | yellowish. |
| 4-hydroxydiphenyl | 49 | Do. |
| 1,4-dihydroxynaphthalene | 34 | dull grey brown. |
| 1,2-dihydroxyanthraquinone | 29 | brilliant red brown. |
| 1,2,5,8-tetrahydroxyanthraquinone | 17 | brilliant dark red. |
| 1,2,3,5,6,7-hexahydroxyanthraquinone | 24 | brilliant brown. |
| 1,2,4,5,6,8-hexahydroxyanthraquinone | 26 | brilliant red brown. |

The indications given in the table clearly show the superior effect of the hydroxyanthraquinones.

*Example 3*

100 grams of a commercial paraformaldehyde were thermally decomposed at 140° to 150° C. The gaseous formaldehyde that formed was purified by being conducted through 3 cooling traps which were connected in series and kept at a temperature of −15° C. Subsequently the formaldehyde was introduced into a polymerization vessel containing 500 cc. of a mixture of aliphatic hydrocarbons boiling at a temperature within the range of 210° to 150° C., 100 milligrams of triphenyl phosphine and 100 milligrams of 1,2,5,8-tetrahydroxyanthraquinone. The polymerization medium was vigorously stirred and kept at a temperature of 25° C. The polymer of formaldehyde that formed was filtered off and washed with cyclohexane. After drying, 36 grams of a brilliant orange polyformaldehyde were obtained which lost 26% of its weight within 30 minutes at 200° C. under nitrogen.

In a comparison test which was carried out in exactly the same way but without the addition of tetrahydroxyanthraquinone 38 grams of a polymer were obtained which lost 45% of its weight within 30 minutes at 200° C. under nitrogen.

We claim:

1. Composition of matter comprising a polyformaldehyde which loses less than 80% of its weight within 30 minutes at 200° C. under nitrogen and as stabilizer 0.01 to 10%, calculated upon the weight of the polyformaldehyde, of a hydroxyanthraquinone containing 2 to 8 hydroxyl groups.

2. A composition as claimed in claim 1 in which the said stabilizer is used as an amount from 0.1 to 5% by weight.

3. Composition of matter comprising a polyformaldehyde which loses less than 80% of its weight within 30 minutes at 200 C. under nitrogen and as stabilizer 0.01 to 10%, calculated on the weight of the polyformaldehyde, of a hydroxyanthraquinone containing 2 to 6 hydroxyl groups.

4. Composition of matter comprising a polyformaldehyde which loses less than 80% of its weight within 30 minutes at 200° C. under nitrogen and as stabilizer 0.01 to 10%, calculated upon the weight of the polyformaldehyde, of 1,2,5,8-tetrahydroxyanthraquinone.

5. Composition of matter comprising a polyformaldehyde which loses less than 80% of its weight within 30 minutes at 200° C. under nitrogen and as stabilizer 0.01 to 10%, calculated upon the weight of the polyformaldehyde, of 1,2,3,5,6,7-hexahydroxyanthraquinone.

6. Composition of matter comprising a polyformaldehyde which loses less than 80% of its weight within 30 minutes at 200° C. under nitrogen and as stabilizer 0.01 to 10%, calculated upon the weight of the polyformaldehyde, of 1,2,4,5,6,8-hexahydroxyanthraquinone.

7. Composition of matter comprising an acetylated polyformaldehyde which loses less than 80% of its weight within 30 minutes at 200° C. under nitrogen and as stabilizer 0.01 to 10%, calculated upon the weight of the acetylated polyformaldehyde, of a hydroxyanthraquinone containing 2 to 8 hydroxyl groups.

8. A process for stabilizing polyformaldehyde which loses less than 80% of its weight within 30 minutes at 200° C. under nitrogen which comprises the step of adding to and intimately mixing with said polyformaldehyde about 0.01 to about 10%, calculated upon the weight of the polyformaldehyde, of a hydroxyanthraquinone containing 2 to 8 hydroxyl groups.

9. A process for stabilizing acetylated polyformaldehyde which loses less than 80% of its weight within 30 minutes at 200° C. under nitrogen which comprises the step of adding to and intimately mixing with said acetylated polyformaldehyde about 0.01 to about 10%, calculated upon the weight of the acetylated polyformaldehyde, of a hydroxyanthraquinone containing 2 to 8 hydroxyl groups.

References Cited in the file of this patent

UNITED STATES PATENTS 2,871,220     MacDonald     Jan. 27, 1959

OTHER REFERENCES

Meek et al.: "Jour. Chem. Soc.," London, vol. 109 (1916), pages 544–61.